United States Patent [19]

Sugiura

[11] Patent Number: 5,170,111
[45] Date of Patent: Dec. 8, 1992

[54] METHOD FOR CONTROLLING POWER GENERATION

[75] Inventor: Tsuneo Sugiura, Iida, Japan

[73] Assignee: Tamagawa Seiki Kabushiki Kaisha, Tokyo, Japan

[21] Appl. No.: 679,300

[22] Filed: Apr. 2, 1991

[30] Foreign Application Priority Data

Nov. 25, 1988 [JP] Japan .................. 63-295994

[51] Int. Cl.⁵ .............................. H02J 7/16
[52] U.S. Cl. ........................... 322/29; 322/86
[58] Field of Search ............... 322/22, 29, 86, 87, 322/88; 320/64, 68

[56] References Cited

U.S. PATENT DOCUMENTS

| 3,689,826 | 9/1972 | Cherry | 322/29 |
| 4,456,870 | 6/1984 | Rodari | 322/29 |
| 4,766,362 | 8/1988 | Sadvary | 322/29 X |
| 5,061,889 | 10/1991 | Iwatani et al. | 322/29 X |

OTHER PUBLICATIONS

Shinko Denki Technical Report No. 114, vol. 32, No. 3, "Special High Speed Alternator and Application of It", pp. 112-117, 1987.

Primary Examiner—Steven L. Stephan
Assistant Examiner—Kristine Peckman
Attorney, Agent, or Firm—Brooks Haidt Haffner & Delahunty

[57] ABSTRACT

The present invention is concerned with a method for power generation which may be used in conjunction with a generator in which a permanent magnet rotor and a Randell rotor provided in a casing are rotated simultaneously and generate power in an armature coil. The method includes a first step of controlling a magnetic flux $\phi 2$ of a control field coil for the Randell rotor with a field controller during low speed rotation in an additive direction to add the magnetic flux $\phi 2$ to a magnetic flux $\phi 1$ produced by the permanent magnet rotor, and a second step of controlling the magnetic flux during high speed rotation in a subtractive direction to subtract the magnetic flux $\phi 2$ from the magnetic flux $\phi 1$, so that a stable output level is produced.

2 Claims, 8 Drawing Sheets

METHOD FOR CONTROLLING POWER GENERATION

BACKGROUND OF THE INVENTION

1. Field of the Invention

This invention relates to a method for power generation and, more particularly, to a method for power generation wherein automatic adjustment may be made quickly to maintain a stable output voltage level despite load fluctuations or fluctuations in the input velocities. The method of the present invention may be used in conjunction with a generator which is small-size; lightweight, capable of developing an elevated velocity and suitably applied to aerospace equipment, unmanned flying objects or unmanned cruising objects.

2. Prior Art

Typical of the arrangements of generators used for these applications are those shown on pages 112 to 117 of Shinko Denki Technical Report No. 114, vol. 32, No. 3, issued in 1987.

FIGS. 1 to 5 of the present application, corresponding respectively to FIGS. 1, 4, 5, 7 and 7 of the above-identified Technical Report, show the arrangements of the conventional generator.

First, FIG. 1 shows a first prior-art example of a brushless AC generator-rectifier circuit system which is constituted by a power generating section 9, made up of a permanent magnet rotor 1, an EX rotary armature 2, rotary rectifier 3, a main generator armature 4, a permanent magnet armature 5, an EX magnetic field 6, a in rotating magnetic field 7 and a rectifier 8; and a voltage regulator 10 connected to the power generating section 9. When the permanent magnet rotor 1 is rotated, a three-phase alternating current is generated in the permanent magnet armature 5.

This three-phase alternating current is converted by a rectifier circuit within the voltage regulator 10 into direct current for direct current excitation the EX magnetic field 6. Three-phase power is generated in the EX rotary armature 2 in proportion to the magnitude of the DC excitation, and converted into DC power by the rectifier 8 enclosed in the rotor for exciting the main rotating magnetic field 7 of the generator. Three-phase AC power is generated in the main generator armature 4 in an amount proportionate to the DC excitation and rectified to produce a DC output.

FIG. 2 shows a second prior-art example of a permanent magnet-thyristor phase control rectifier system, which consists of a generator 9, made up of a permanent magnet rotor 1, an armature 5 and a thyristor 12; and a voltage regulator 10, made up of a phase angle control 13, a voltage detection circuit 14 and a filter unit 15. The AC output from the generator is rectified by thyristor 12 by controlling its phase control angle and passed through filter unit 15 to produce a voltage-controlled DC output.

FIGS. 3 to 5 show a third prior-art example of a Randell type AC generator-rectifier circuit system, which is constituted by a generator 9, made up of a Randell rotor 1A, a field winding, 16, an armature winding 5 and a rectifier 8; and a voltage regulator 10.

The Randell type AC generator is constructed as shown in FIGS. 4 and 5, wherein a rotary shaft 22 is rotatably mounted in a casing 20 by means of a bearing 21, and the Randell rotor 1A is mounted on the rotary shaft 22.

A stator 23 for the armature winding 5 and a fixed field winding 16 provided on a fixed field core 24 are provided in the casing 20. The Randell rotor 1A is made up of a rotor A, a rotor B and a connection ring 26.

Thus the magnetic fluxes generated by the fixed field winding 16 flow through an air gap, rotor A (N pole side), another air gap, the stator 23, a further air gap, the rotor B (S pole side), the fixed field core 24 and a still further air gap in this order.

On the surface of the Randell rotor 1A, as viewed from the armature side of the stator 23, magnetic poles of a rotating magnetic field are generated, as in the case of the usual synchronous generator.

Voltage control may be achieved easily by controlling the current through the fixed field winding.

The above described prior-art generators suffer from the following disadvantages.

The first type device, while being devoid of brushes, is highly complicated in construction, and is difficult to manufacture.

The second type device is simple in construction as a generator. However, the phase-controlled output waveform is poor as a result of velocity fluctuations and the use of a filter unit is not effective to improve the output voltage characteristics, such that it is difficult to realize output compensations against sudden load fluctuations.

The third type device is thought to satisfy the requirements fairly well and hence it is currently in popular use. As a major disadvantage, the field current has to be obtained by, for example, an initial external power source, while self-starting is not feasible.

The device also suffers from field current losses as compared to the rotating magnet type device, and suffers from an increase in weight.

In addition, the fixed field wiring needs to be strongly secured against velocity or load fluctuations, while the field controller tends to be bulky.

OBJECTS AND SUMMARY OF THE INVENTION

It is therefore a principal object of the present invention to provide a method for power generation wherein automatic adjustment may be made easily so that a stable output voltage level may be maintained despite load fluctuations or fluctuations in the input velocities.

The present invention provides a method for power generation which may be used in conjunction with a generator in which a permanent magnet rotor and a Randell rotor provided in a casing are rotated simultaneously and in which the power output generated by the permanent magnet rotor and the Randell rotor is synthesized by an armature coil. The method includes a first step of controlling the magnetic flux $\phi 2$ of a control field coil of a Randell rotor by a field controller during low speed rotation in an additive direction by adding the magnetic flux $\phi 2$ the magnetic flux $\phi 1$ produced by the permanent magnet rotor, and a second step of controlling the magnetic flux during high speed rotation in a subtractive direction by subtracting the magnetic flux $\phi 2$ from the magnetic flux $\phi 1$, so that a stable output level is produced by the first and second steps.

With the method for power generation according to the present invention, if the rotating member of the generator is in the state of low speed rotation and the power output by the permanent magnet rotor has not reached a predetermined stable output level, the magnetic flux $\phi 2$ of the control field coil in the field coil assembly of the Randell rotor is controlled by a field controller so as to be added to the magnetic flux $\phi_1$ generated by the permanent magnet rotor to compensate for an output not sustained by the power generated by the rotation of the permanent magnet rotor to provide a predetermined stable output level even during the condition of low speed rotation.

Conversely, when the rotating member of the generator is in high speed rotation, and the power output by the permanent magnet rotor exceeds a predetermined stable output level, the magnetic flux $\phi_2$ of the control field coil in the field coil assembly of the Randell rotor is controlled by a field controller to subtract from the magnetic flux $\phi_1$ generated by the permanent magnet rotor to lower the output level by an amount corresponding to the excess power generated by the rotation of the permanent magnet rotor to produce a stable output level even during high speed rotation.

In this manner, a stable output level may be maintained at any time by combining the power generated by the permanent magnet rotor having a high power generation efficiency, and a power generated by the Randell rotor having high controllability, under the control of the field controller.

If a series field coil is provided on the side of the Randell rotor, and a DC output is coupled directly to this series field coil, a larger current flows through the series field coil during sudden load fluctuations to cope with load fluctuations promptly to maintain a stable output level.

DETAILED DESCRIPTION OF THE PREFERRED EMBODIMENTS

Figure 1:
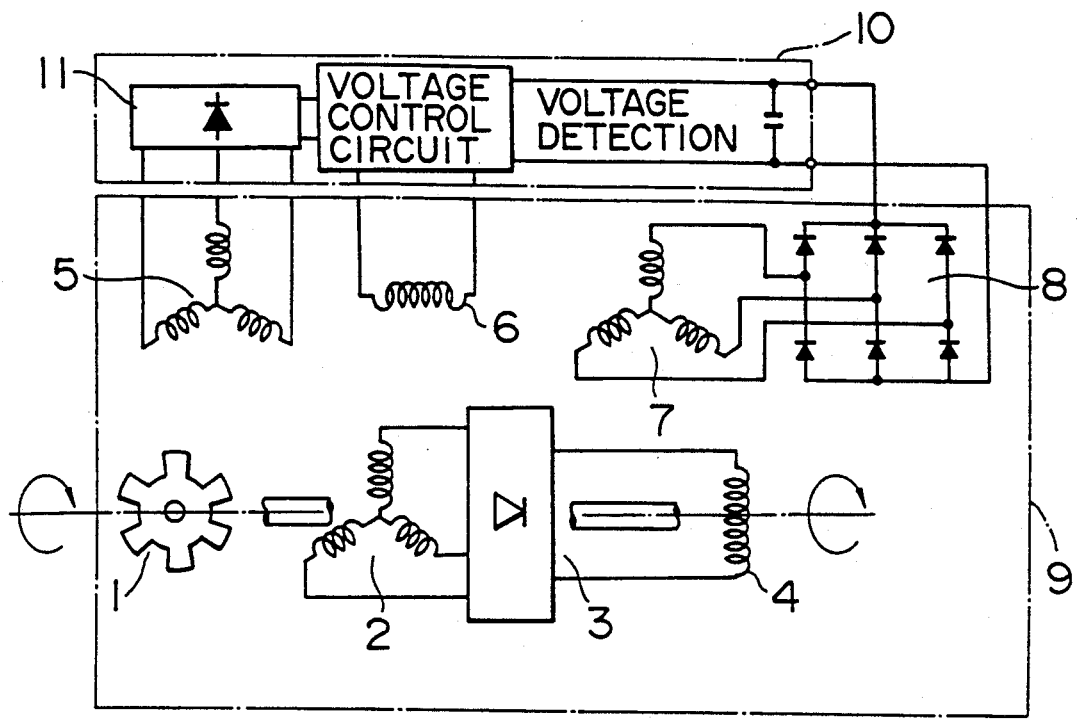
FIGS. 1 to 3 illustrate control units for a power generating system of prior-art generators.
Figure 2:
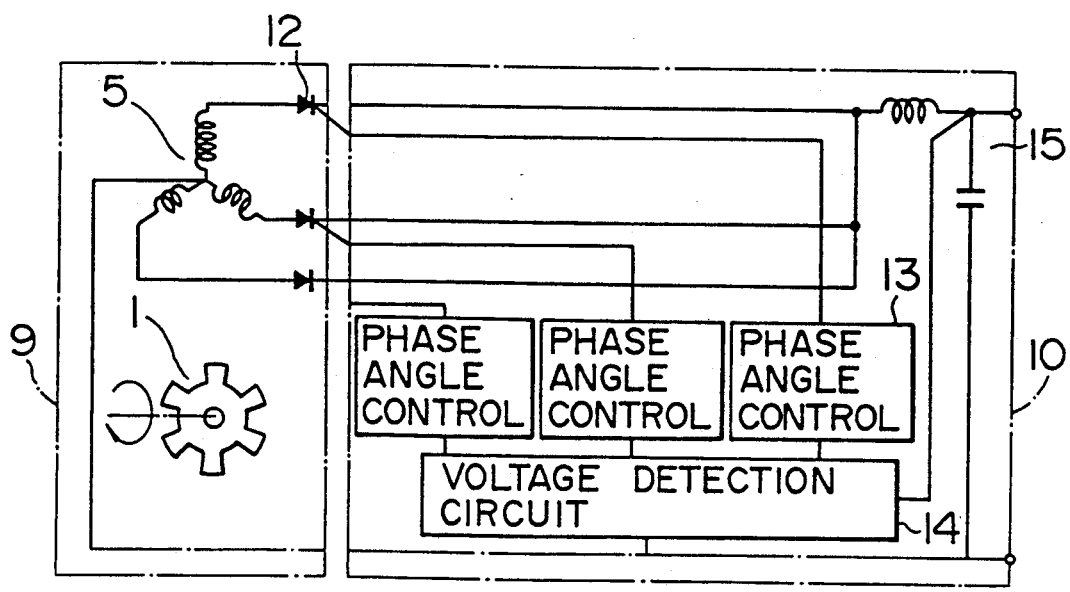
Figure 3:
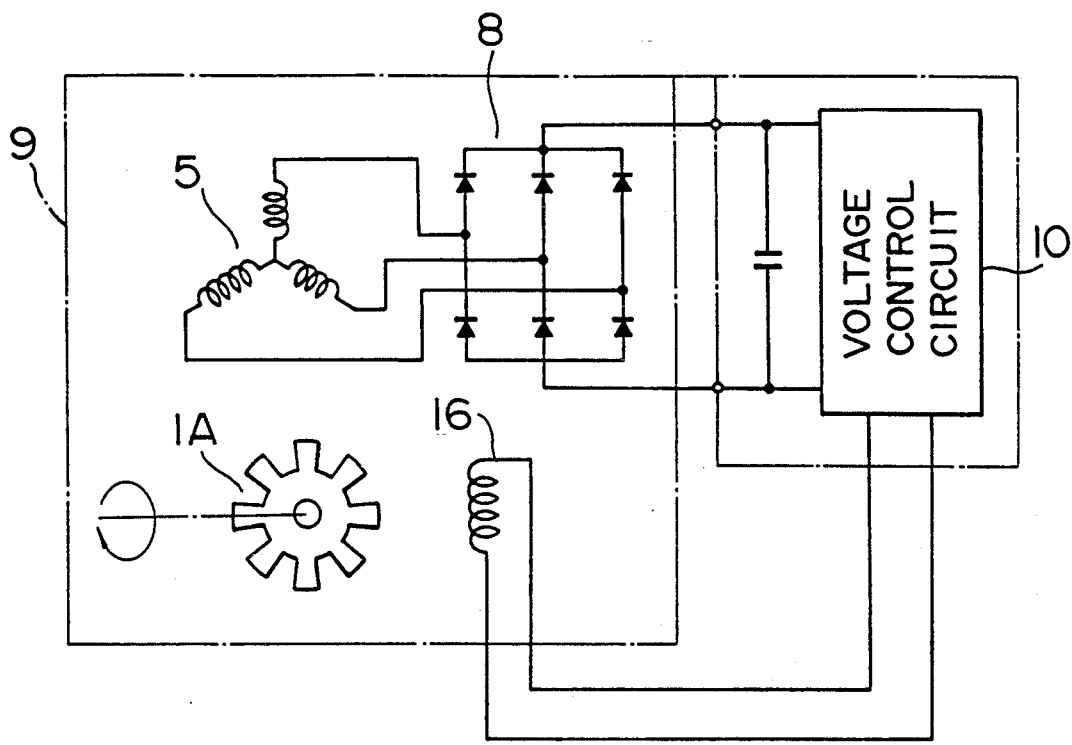
Figure 4:
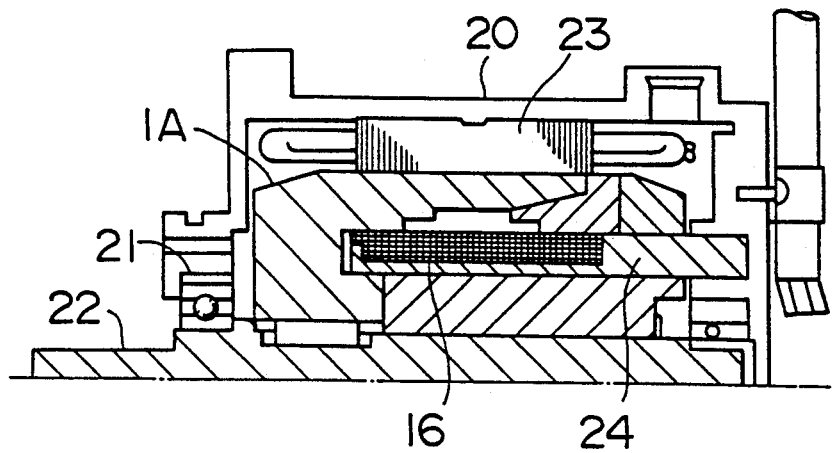
FIG. 4 is a side elevational view, shown partly in section, and showing a prior-art generator.

By referring to the drawings, illustrative embodiments of the generator of the present invention will be explained in detail.

In the drawings, the parts or components similar to those of the prior-art examples are depicted by the same reference numerals.

Figure 5:
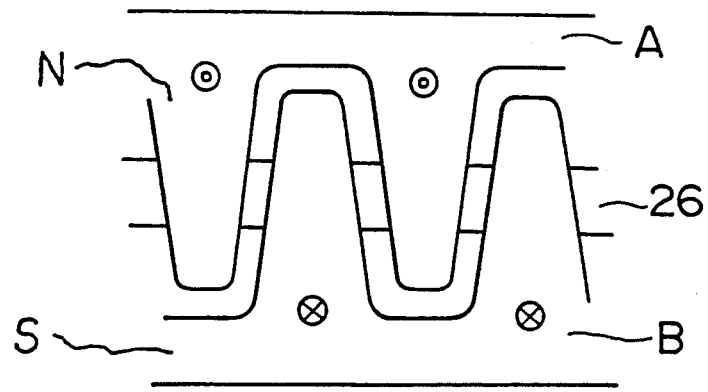
FIG. 5 is an illustrative view of the prior-art generator shown in FIG. 4.
Figure 6:
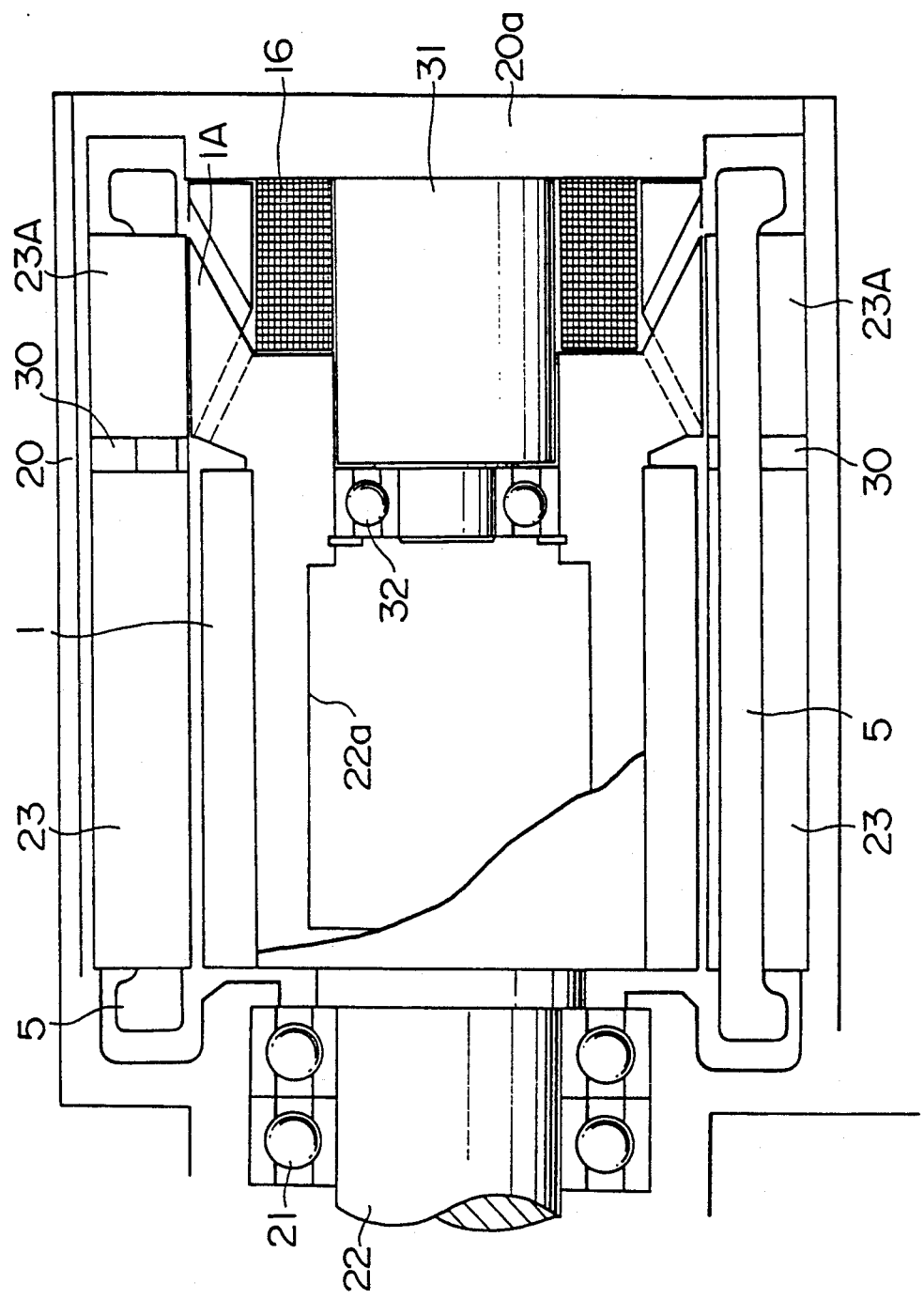
FIG. 6 is a side elevational view, shown partially in cross-section, and showing a generator according to an embodiment of the present invention.

Referring to FIGS. 6 to 10 showing the generator of the present invention, and first to FIG. 6, a hollow rotating member 22 is mounted for rotation within a casing 20 by means of a bearing 21. On the rotating member 22, a permanent magnet rotor 1, composed mainly of rare earth elements, and a Randell rotor 1A, which is the same as that described in connection with FIG. 5, are provided in tandem along the axis of the rotating member 22.

On the inner wall of the casing 20, a stator 23 for the permanent magnet rotor and a stator 23A for the Randell rotor 1A are separately provided by the interposition of a non-magnetic member 30, such as an air gap, in order to prevent an interference loop from being generated between the stators 23 and 23A. The armature 5 is associated as an output coil, with the stators 23 and 23A.

A bearing 32 is carried by the distal end of a retainer 31 provided on a side wall 20a of the casing 20, protruding axially into the interior of the casing 20. The rotating member 22 is rotatably supported at a mid position of the hollow section 22a thereof by the bearing 32 for improving the rigidity of the rotational support of the rotating member 22.

Figure 7:
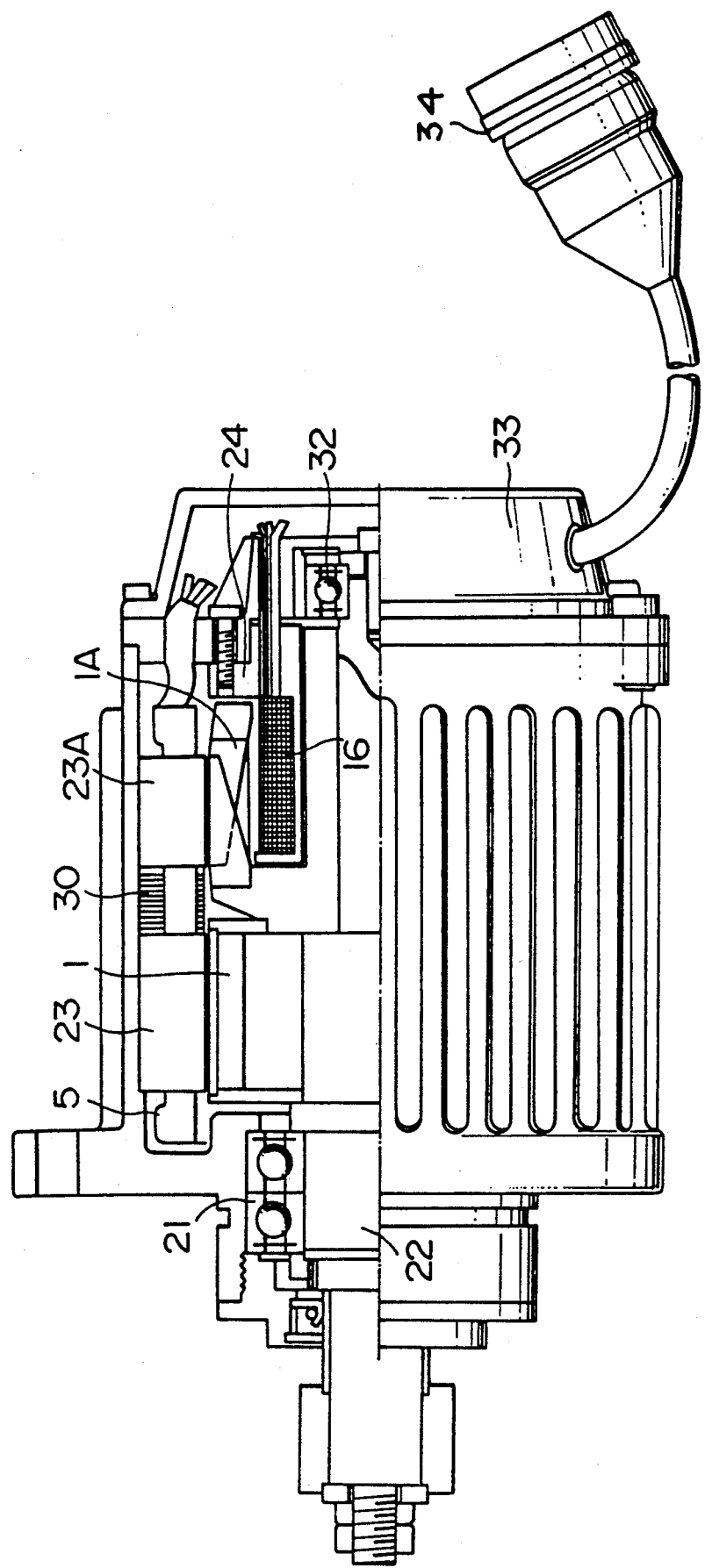
FIG. 7 is a side elevational view, shown partially in section, and showing a generator according to a modification.
Figure 10:
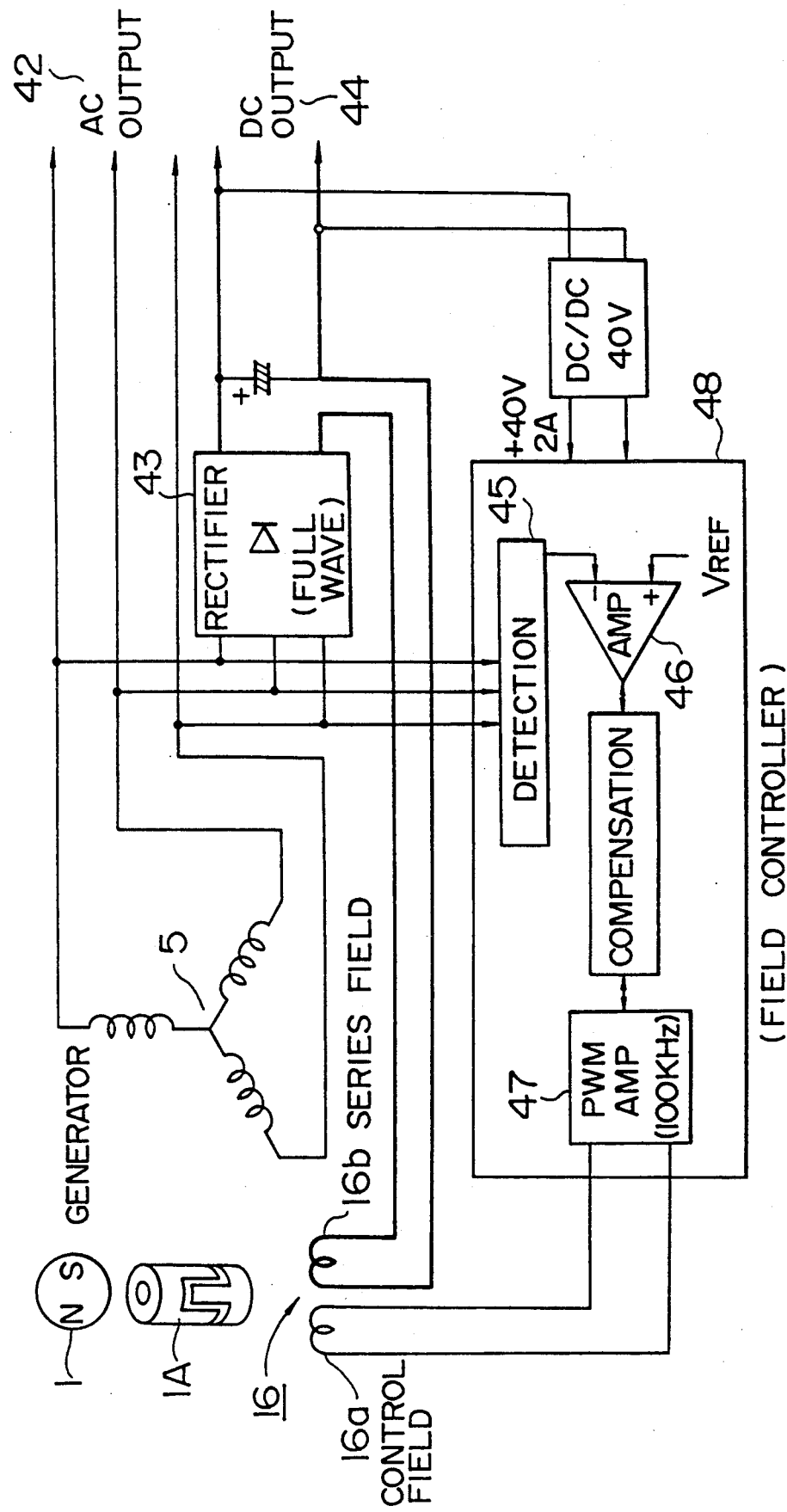
FIG. 10 illustrates a control unit for a power generating system of the generator shown in FIG. 6.

A Randell field coil 16 consisting of a control coil 16a and a series coil 16b as shown in FIG. 10 is placed on the outer periphery of the reatiner 31 in the embodiment shown in FIG. 6. The modification of FIG. 7 is similar to the embodiment shown in FIG. 6 except that the bearing 32 is provided towards the terminal portion of the rotating member 22, instead of at the mid portion thereof, and the Randell field coil 16 is retained by a magnetic bobbin 24. A cover 33 provided on the casing 20 is fitted with a connector 34 for leading the generated output power out of the generator.

Figure 8:
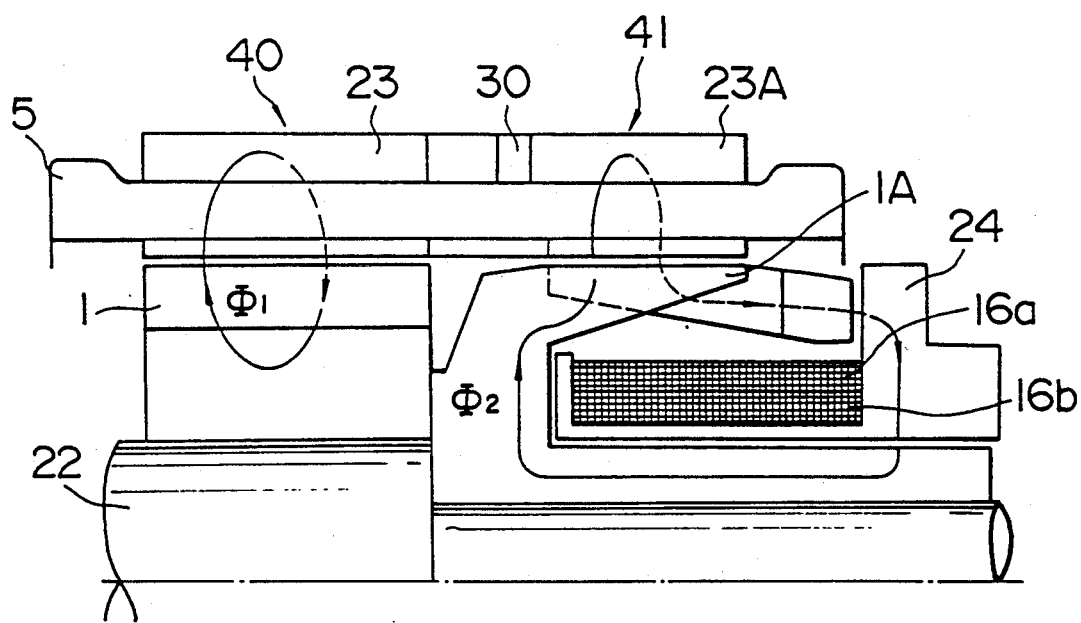
FIG. 8 is a schematic side elevational view showing a portion of FIG. 7 in detail.
Figure 9:
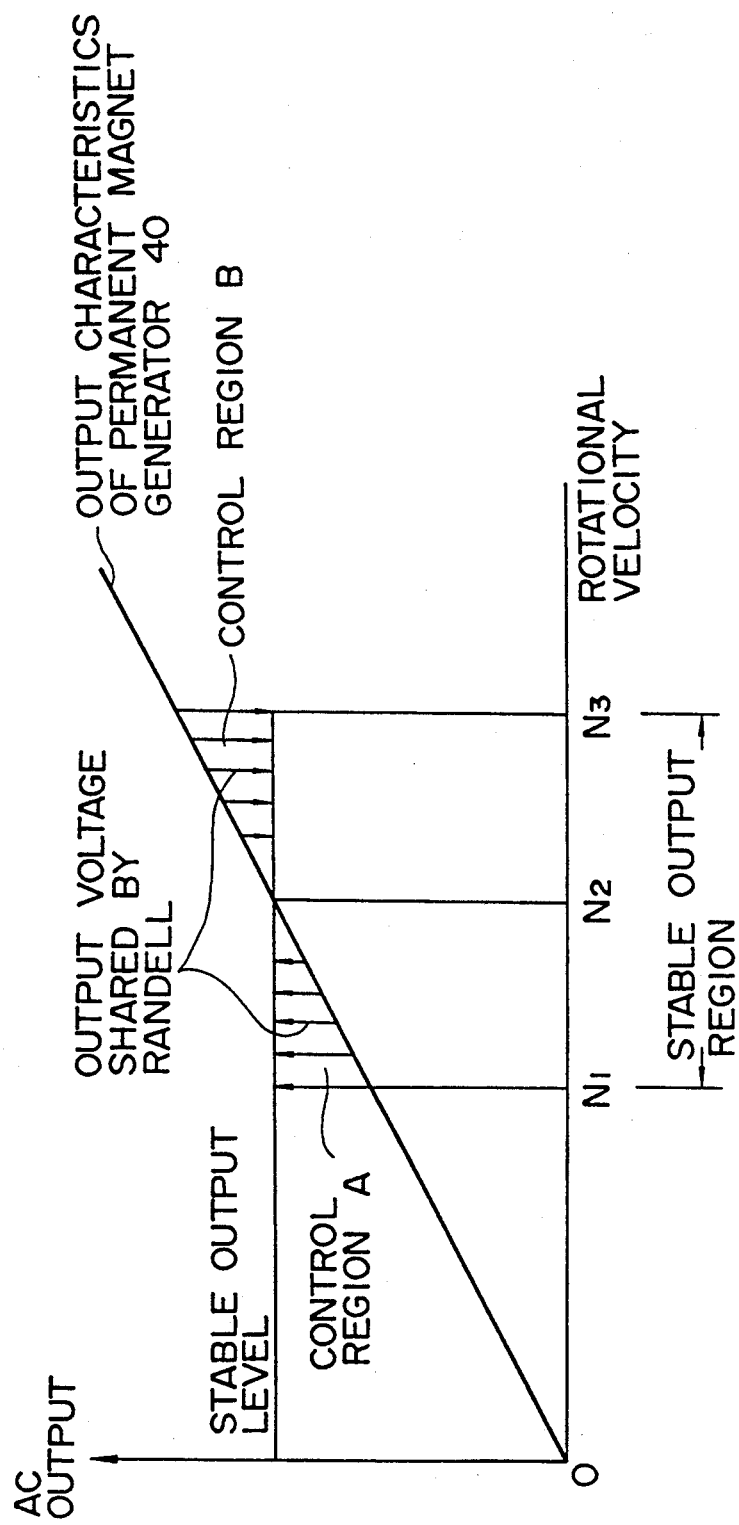
FIG. 9 is a diagram showing output characteristics the generator shown in FIG. 6.

Referring to FIG. 8, details of certain portions of the construction of FIG. 7 are shown to an enlarged scale, while the magnetic fluxes through the permanent magnet type power generating section 40 and the Randell type power generating section 41 are also shown. The parts or components similar to those shown in FIG. 7 are indicated by the same reference numerals and the corresponding description is omitted for simplicity.

FIG. 10 shows a control unit for the power generating system. An AC output 42, that is the three-phase AC voltage, produced by the armature winding 5, is taken out directly, while a DC output 44 is taken out by means of a rectifier circuit 43.

Part of the AC output 42 and the DC output 44 are supplied to the control field 16a, as the fixed side, by means of a field controller 48, consisting of a detection circuit 45, a comparator 46 and a waveform modulation/amplifier circuit 47, while part of the DC output 44 is supplied to the series field coil 16b as the load side.

The above described generator of the present invention operates in the following manner.

When the rotating member 22 and thereby the permanent magnet rotor 1 start their rotation, power generation is started by the permanent magnet rotor 1 in the armature winding 5. With an increase in the rotational speed of the rotor, the AC output 42 is generated along an output characteristic curve of the permanent magnet power generating section 40 shown in FIG. 9.

The AC output 42 is full-wave rectified by the rectifier circuit 43 so as to be used as a power source (+40 V, 2A) for field controller 48.

The field controller 48 starts its operation when the AC output 42 is supplied thereto. Thus the field controller 48 detects the generated voltage by the detection circuit 45 and, if the detected voltage is lower than the required stable output level, with the rotational speed being not more than $N_2$, a magnetic flux $\phi_2$ is generated by the control field coil 16a of the Randell rotor 1A in a direction to be added to a magnetic flux $\phi_1$ generated by the permanent magnet rotor 1, thereby providing a stable output level as indicated by the control region A shown in FIG. 9.

When the rotational speed of the rotating member 22 is increased further, such that the output of the permanent magnet power generating section 40 exceeds controlled for generating the magnetic flux $\phi 2$ in a direction to be subtracted from the magnetic flux $\phi 1$ for providing a stable output level shown by the control region B.

Should there occur load fluctuations, a large current flows simultaneously through the series field coil 16b connected in series with the load, thereby directly compensating for load fluctuations in the Randell power generating section 41 without the intermediary of the field controller 48 without any accompanying time lag.

In this manner, owing to the control operations by both the control field coil 16a and the series field coil 16b of the self-starting Randell power generating section 41, a stable output level may be established and maintained promptly against load fluctuations and Although the foregoing description has been made the embodiment in which the permanent magnet power generating section 40 and the Randell power generating section 41 are arranged in tandem along the axial direction, the present invention may also be applied to a radial type system or to an axial gap type or a disc type system in which the Randell stator 23A and the Randell rotor 1A in the Randell power generating system 41 are arranged axially, instead of radially, and in opposition to each other.

What is claimed is:

1. A method for controlling power generation with a generator in which a permanent magnet rotor (1) and a Randell rotor (1A) provided in a casing (20) are rotated simultaneously and generate power in an armature coil (5), said method comprising a first step of controlling a magnetic flux $\phi 2$ of a control field coil (16a) for said Randell rotor (1A) with a field controller (48) during low speed rotation in an additive direction to add said magnetic flux $\phi 2$ to a magnetic flux $\phi 1$ produced by said permanent magnet rotor (1), and a second step of controlling said magnetic flux $\phi 2$ during high speed rotation in a subtractive direction to subtract said magnetic flux $\phi 2$ from said magnetic flux $\phi 1$, such that a stable output level is produced.

2. The method for controlling power generation according to claim 1, wherein said generator includes a series field coil (16b) which is directly connected to a DC output (44) that is related to said generated power and disposed for cooperation with said control field coil (16a) in developing a magnetic field, the further step of supplying, when said generator is coupled to a load, a current to said series field coil (16b) during load fluctuations without going through said field controller (48) where the magnitude of said current is a function of the magnitude of the load.

* * * * *

UNITED STATES PATENT AND TRADEMARK OFFICE
CERTIFICATE OF CORRECTION

PATENT NO. : 5,170,111
DATED : December 8, 1992
INVENTOR(S) : T. Sugiura

It is certified that error appears in the above-identified patent and that said Letters Patent is hereby corrected as shown below:

Column 1, line 14, after "size" delete semi-colon ";", insert comma --,--; line 32, after "a", delete "in", insert --main--; line 40, after "excitation" insert --of--; line 41, after "phase" insert --AC--; line 62, after "winding" delete comma ",".

Column 2, line 56, before "the" (second occurrence) insert --to--.

Column 3, line 48 before "the" insert --of--.

Column 5, line 3, after "exceeds" insert --the stable output level, the control field coil 16a is--; line 20, after "and" insert --fluctuations in the rotational velocities.--; line 22, before "the" (first occurrence) insert --of--.

Signed and Sealed this

Seventh Day of December, 1993

Attest:

BRUCE LEHMAN

Attesting Officer

Commissioner of Patents and Trademarks